US009868888B2

(12) United States Patent
Kujak et al.

(10) Patent No.: US 9,868,888 B2
(45) Date of Patent: *Jan. 16, 2018

(54) REFRIGERANT COMPOSITIONS

(71) Applicant: TRANE INTERNATIONAL INC., Davidson, NC (US)

(72) Inventors: Stephen A. Kujak, Onalaska, WI (US); Kenneth J. Schultz, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,037

(22) Filed: Jan. 30, 2017

(65) Prior Publication Data

US 2017/0137681 A1    May 18, 2017

Related U.S. Application Data

(63) Continuation of application No. 14/938,520, filed on Nov. 11, 2015, now Pat. No. 9,556,372.

(60) Provisional application No. 62/085,019, filed on Nov. 26, 2014.

(51) Int. Cl.
C09K 5/04 (2006.01)

(52) U.S. Cl.
CPC ........ *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC ........ C09K 2205/122; C09K 2205/126; C09K 5/045; C09K 5/048; C09K 2205/32; C09K 2205/34
USPC .................................................... 252/67, 68
See application file for complete search history.

(56) References Cited

U.S. PATENT DOCUMENTS

| 4,220,011 | A | 9/1980 | Bergman et al. |
| 4,223,537 | A | 9/1980 | Sanborn |
| 7,421,855 | B2 | 9/2008 | Ring et al. |
| 7,556,482 | B2 | 7/2009 | Benco et al. |
| 7,819,644 | B2 | 10/2010 | Eber et al. |
| 7,856,834 | B2 | 12/2010 | Haley |
| 7,914,698 | B2 | 3/2011 | Minor et al. |
| 8,011,196 | B2 | 9/2011 | Eber et al. |
| 8,132,420 | B2 | 3/2012 | Okoren et al. |
| 8,454,334 | B2 | 6/2013 | Heger et al. |
| 8,613,555 | B2 | 12/2013 | Benco et al. |
| 8,627,680 | B2 | 1/2014 | Haley et al. |
| 8,875,530 | B2 | 11/2014 | Foye et al. |
| 9,022,760 | B2 | 5/2015 | Bakkestuen et al. |
| 9,032,753 | B2 | 5/2015 | Love et al. |
| 9,032,754 | B2 | 5/2015 | Love et al. |
| 9,523,027 | B2 * | 12/2016 | Minor ................. C09K 5/045 |
| 9,540,556 | B2 * | 1/2017 | Minor ................. C08J 9/146 |
| 9,556,372 | B2 * | 1/2017 | Kujak ................. C09K 5/045 |
| 2010/0193155 | A1 | 8/2010 | Nakatani et al. |
| 2011/0100051 | A1 | 5/2011 | Edens et al. |
| 2011/0108756 | A1 * | 5/2011 | Tsuchiya ............. C09K 5/045 252/68 |
| 2011/0146317 | A1 | 6/2011 | Cline et al. |
| 2013/0055738 | A1 | 3/2013 | Rached |
| 2013/0075069 | A1 | 3/2013 | Michael |
| 2013/0096218 | A1 * | 4/2013 | Rached ................. C09K 5/045 521/170 |
| 2013/0145778 | A1 * | 6/2013 | Yana Motta ........... C09K 5/045 62/77 |
| 2013/0283830 | A1 | 10/2013 | Jandal et al. |
| 2013/0283832 | A1 | 10/2013 | Kujak et al. |
| 2014/0102665 | A1 | 4/2014 | Sibik et al. |
| 2014/0137578 | A1 | 5/2014 | Yana Motta et al. |
| 2014/0191153 | A1 * | 7/2014 | Yana Motta .............. C09K 3/30 252/67 |
| 2014/0223927 | A1 | 8/2014 | Pottker et al. |
| 2014/0223936 | A1 | 8/2014 | Hartfield et al. |
| 2014/0224460 | A1 | 8/2014 | Means |
| 2014/0360210 | A1 | 12/2014 | Lapp et al. |
| 2015/0030489 | A1 | 1/2015 | Beekman et al. |
| 2015/0030490 | A1 | 1/2015 | Beekman et al. |
| 2015/0034284 | A1 | 2/2015 | Sullivan |
| 2015/0037184 | A1 | 2/2015 | Rood et al. |
| 2015/0037186 | A1 | 2/2015 | Smerud et al. |

(Continued)

FOREIGN PATENT DOCUMENTS

| EP | 1985680 | 10/2008 | |
| EP | 1985680 A2 * | 10/2008 | ........... A62D 1/0057 |
| FR | WO 2011141655 A2 * | 11/2011 | ............. C09K 5/045 |
| WO | 2009/104784 | 8/2009 | |
| WO | 2011141655 | 11/2011 | |
| WO | 2015054104 | 4/2015 | |
| WO | WO 2015054104 A1 * | 4/2015 | ............. C09K 5/045 |

OTHER PUBLICATIONS

International Search Report and Written Opinion for PCT/IB2015/002276, dated Mar. 18, 2016 (10 pages).
Wu, J. et al., Performance of mixture refrigerant R152a/R125/R32 in domestic air-conditioner International Journal of Refrigeration, 2009, vol. 32, pp. 1049-1057, Abstract provided.
Extended European Search Report, European Patent Application No. 15858568.7, dated Oct. 11, 2017 (6 pages).

*Primary Examiner* — Douglas McGinty
(74) *Attorney, Agent, or Firm* — Hamre, Schumann, Mueller & Larson, P.C.

(57) ABSTRACT

Refrigerant compositions are described, which can be used for example, in refrigeration, air conditioning, and/or heat pump systems which for example, can be incorporated into a heating, ventilation and air conditioning (HVAC) system or unit. The refrigerant composition includes an amount of a R125 refrigerant, an amount of a R32 refrigerant, and an amount of a R1234yf refrigerant, where the R32 refrigerant has higher flammability than the R125 refrigerant, and the R1234yf refrigerant has higher flammability than the R125 refrigerant.

8 Claims, No Drawings

(56) References Cited

U.S. PATENT DOCUMENTS

| | | |
|---|---|---|
| 2015/0037192 A1 | 2/2015 | Smerud et al. |
| 2015/0093273 A1 | 4/2015 | Johnson et al. |
| 2015/0192371 A1 | 7/2015 | Hancock |
| 2015/0247658 A1 | 9/2015 | Cosby et al. |
| 2015/0260441 A1 | 9/2015 | Sibik |
| 2015/0276282 A1 | 10/2015 | Heiden et al. |
| 2015/0276287 A1 | 10/2015 | Cosby et al. |
| 2016/0215192 A1 | 7/2016 | Minor et al. |
| 2016/0222272 A1* | 8/2016 | Rached ............... C09K 5/045 |

* cited by examiner

REFRIGERANT COMPOSITIONS

FIELD

The disclosure herein relates to refrigerant compositions, which can be used in, for example, refrigeration, air conditioning, and/or heat pump systems, which, for example, can be incorporated into a heating, ventilation and air conditioning (HVAC) system or unit.

BACKGROUND

Concern about environment impact, e.g. ozone depletion, and the approval of the Montreal Protocol resulted in a movement to replace ozone depleting refrigerant compositions, such as for example, chlorofluorocarbons (CFCs) and hydrochlorofluorocarbons (HCFCs). As a result, replacement refrigerant compositions, such as for example hydrofluorocarbon (HFC) refrigerants and hydrofluoroolefins (HFOs) refrigerants are commercialized. However, it has been recognized that HFC refrigerants may contribute to environment changes through their relatively large greenhouse effect, e.g. having a relatively large global warming potential (GWP).

SUMMARY

Refrigerant compositions are described, which can be used for example, in refrigeration, air conditioning, and/or heat pump systems which for example, can be incorporated into a heating, ventilation and air conditioning (HVAC) system or unit. The refrigerant composition includes an amount of a R125 refrigerant, an amount of a R32 refrigerant, and an amount of a R1234yf refrigerant, where the R32 refrigerant has higher flammability than the R125 refrigerant, and the R1234yf refrigerant has higher flammability than the R125 refrigerant.

DETAILED DESCRIPTION

Some relatively low GWP HFCs, (e.g. R32, R152a) and ultra-low GWP HFOs (e.g. R1234yf, R1234ze(E)) are mildly flammable, which may prevent the use of these low GWP refrigerants in a building HVAC system.

Embodiments as disclosed herein are directed to refrigerant compositions to reduce flammability of a refrigerant or a refrigerant composition, e.g. a refrigerant composition of low GWP HFC R32 and/or an ultra-low GWP HFO R1234yf, by including a non-flammable refrigerant (e.g. R125). In some embodiments, refrigerant compositions including a flammable refrigerant composition such as for example a low GWP HFC R32 and/or an ultra-low GWP HFO R1234yf, and a non-flammable refrigerant R125 are disclosed. The refrigerant compositions may have a lower flammability than the refrigerant composition of R32 and/or R1234yf, a GWP that is lower than R32, and similar performance characteristics as the refrigerant composition of R32 and/or R1234yf.

In some embodiments, R125 may be added to a current refrigerant in the HVAC system to reduce the flammability of the HVAC system. In some embodiments, the current refrigerant in the HVAC system may include R32. In some embodiments, the current refrigerant in the HVAC system may be 72.5% wt R32 and 27.5% wt R1234yf, which is marketed as DR-5 by Dupont®, or may be 68.9% wt R32 and 31.1% wt R1234yf, which is marketed as DR-5A by Dupont®. In some embodiments, the current refrigerant can be other suitable refrigerants, some of which can be found in U.S. Pat. No. 7,914,698, which is incorporated herein by reference in its entirety.

Exemplary embodiments of refrigerant compositions as disclosed herein are listed in the following Table 1.

TABLE 1

| Composition (% by weight) | GWP | BV |
|---|---|---|
| 50% R32/50% R125 | 1924 | n/a |
| 100% R32 | ~677 | 6.7 |
| R32/R125/R1234yf (74.0%/5.5%/20.5%) | ~677 (e.g. 675) | 3.4 |
| R32/R125/R1234yf (69.0%/6.5%/25.5%) | ~677 (e.g. 673) | 3.1 |
| R32/R125/R1234yf (67.0%/7.0%/26.0%) | ~677 | 3.0 |
| R32/R125/R1234yf (64.0%/7.5%/28.5%) | ~677 (e.g. 671) | 2.8 |
| R32/R125/R1234yf (62.0%/10.5%/27.5%) | ~750 (e.g. 753) | 2.6 |
| R32/R125/R1234yf (20.0%/17.5%/62.5%) | ~677 (e.g. 674) | 1.3 |
| R32/R125/R1234yf (18.0%/20.0%/62.0%) | ~750 (e.g. 756) | 1.1 |

Table 1 illustrates simulation results of GWP and BV of various refrigerant compositions. As illustrated in Table 1, a refrigerant composition R32/R125 (50% wt/50% wt) has a GWP of 1924 is refrigerant R410A and can be compared to other refrigerant blends for potential replacement.

Refrigerant compositions of R32/R125/R1234yf (74.0% wt/5.5% wt/20.5% wt), R32/R125/R1234yf (69.0% wt/6.5% wt/25.5% wt), R32/R125/R1234yf (64.0% wt/7.5% wt/28.5% wt) and R32/R125/R1234yf (20.0% wt/17.5% wt/62.5% wt) may have a similar GWP as 100% wt R32 (e.g. 677), but increasingly lower BV (e.g. lower flammability) respectively compared to 100% wt R32 (e.g. 6.7). The refrigerant composition of R32/R125/R1234yf (62.0% wt/10.5% wt/27.5% wt), and R32/R125/R1234yf (18.0% wt/20.0% wt/62.0% wt) may have a slightly higher GWP (e.g. 750) compared to 100% wt R32, but a lower BV (e.g. at about 1). The refrigerant composition R32/R125/R1234yf (74.0% wt/5.5% wt/20.5% wt) may be used to replace R410A in some applications. More preferred, the refrigerant compositions R32/R125/R1234yf (69.0% wt/6.5% wt/25.5% wt) may be used to replace R410A in some applications because, for example, a capacity of the refrigerant compositions may be similar to R410A. Even more preferred, any one or more of the refrigerant compositions R32/R125/R1234yf (67.0%/7.0%/26.0%) or R32/R125/R1234yf (64.0% wt/7.5% wt/28.5% wt) or R32/R125/R1234yf (62.0% wt/10.5% wt/27.5% wt) may be used to replace R410A in some applications. The refrigerant compositions R32/R125/R1234yf (20.0% wt/17.5% wt/62.5% wt) or R32/R125/R1234yf (18.0% wt/20.0% wt/62.0% wt) may be used to replace R22, R407C or R404A in some applications, because, for example, a capacity of the refrigerant compositions may be similar to R22, R407C or R404A.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A refrigerant composition comprising:
   an amount of a R125 refrigerant;
   an amount of a R32 refrigerant; and
   an amount of a R1234yf refrigerant,
   the R32 refrigerant has higher flammability than the R125 refrigerant, and the R1234yf refrigerant has higher flammability than the R125 refrigerant,
   wherein the amount of R125 refrigerant is 5.5% wt, 6.5% wt, 7.0% wt, 7.5% wt, or 10.5% wt.

2. The refrigerant composition of claim 1, wherein, when the amount of R125 refrigerant is 5.5% wt, the amount of R32 refrigerant is 74.0% wt and the amount of R1234yf refrigerant is 20.5% wt.

3. The refrigerant composition of claim 1, wherein, when the amount of R125 refrigerant is 6.5% wt, the amount of R32 refrigerant is 68.0% wt and the amount of R1234yf refrigerant is 25.5% wt.

4. The refrigerant composition of claim 1, wherein, when the amount of R125 refrigerant is 7.5% wt, the amount of R32 refrigerant is 64.0% wt and the amount of R1234yf refrigerant is 28.5% wt.

5. The refrigerant composition of claim 1, wherein, when the amount of R125 refrigerant is 10.5% wt, the amount of R32 refrigerant is 62.0% wt and the amount of R1234yf refrigerant is 27.5% wt.

6. The refrigerant composition of claim 1, wherein, when the amount of R125 refrigerant is 7.0% wt, the amount of R32 refrigerant is 67.0% wt and the amount of R1234yf refrigerant is 26.0% wt.

7. A refrigerant composition comprising:
   an amount of a R125 refrigerant;
   an amount of a R32 refrigerant; and
   an amount of a R1234yf refrigerant,
   the R32 refrigerant has higher flammability than the R125 refrigerant, and the R1234yf refrigerant has higher flammability than the R125 refrigerant,
   wherein the amount of R32 refrigerant is 20.0% wt, the amount of R125 refrigerant is 17.5% wt, and the amount of R1234yf refrigerant is 62.5% wt.

8. A refrigerant composition comprising:
   an amount of a R125 refrigerant;
   an amount of a R32 refrigerant; and
   an amount of a R1234yf refrigerant,
   the R32 refrigerant has higher flammability than the R125 refrigerant, and the R1234yf refrigerant has higher flammability than the R125 refrigerant,
   wherein the amount of R32 refrigerant is 18.0% wt, the amount of R125 refrigerant is 20.0% wt, and the amount of R1234yf refrigerant is 62.0% wt.

* * * * *